United States Patent
Kim et al.

(10) Patent No.: US 9,480,970 B2
(45) Date of Patent: Nov. 1, 2016

(54) CATALYST CARRIER FOR A SPACECRAFT THRUSTER AND METHOD FOR PREPARING SAME

(75) Inventors: Su Kyum Kim, Daejeon (KR); Myoung Jong Yu, Daejeon (KR); Sung June Cho, Gwangju (KR); Sang Ryool Lee, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 1203 days.

(21) Appl. No.: 13/377,487

(22) PCT Filed: Dec. 21, 2010

(86) PCT No.: PCT/KR2010/009130
§ 371 (c)(1),
(2), (4) Date: Dec. 21, 2011

(87) PCT Pub. No.: WO2011/081341
PCT Pub. Date: Jul. 7, 2011

(65) Prior Publication Data
US 2012/0184428 A1 Jul. 19, 2012

(30) Foreign Application Priority Data
Dec. 30, 2009 (KR) .......................... 10-2009-0134608

(51) Int. Cl.
*B01J 21/04* (2006.01)
*B01J 37/08* (2006.01)
*B01J 32/00* (2006.01)
*B01J 21/06* (2006.01)
(Continued)

(52) U.S. Cl.
CPC ................ *B01J 21/04* (2013.01); *B01J 23/02* (2013.01); *B01J 35/023* (2013.01); *B01J 35/108* (2013.01); *B01J 35/1076* (2013.01); *B01J 37/0018* (2013.01); *B01J 37/0201* (2013.01); *C06D 5/04* (2013.01)

(58) Field of Classification Search
CPC ......................................................... B01J 21/04
See application file for complete search history.

(56) References Cited

U.S. PATENT DOCUMENTS 4,252,544 A * 2/1981 Takahashi ........................ 51/309
5,126,310 A * 6/1992 Golden .................... B01J 20/32
423/245.1

(Continued)

FOREIGN PATENT DOCUMENTS

JP 06-000373 1/1994
KR 10-1981-0000068 2/1981

(Continued)

OTHER PUBLICATIONS

International Search Report dated Sep. 30, 2011, issued in Application PCT/KR2010/009130, with English translation.

(Continued)

*Primary Examiner* — Melvin C Mayes
*Assistant Examiner* — Douglas B Call
(74) *Attorney, Agent, or Firm* — The Webb Law Firm

(57) ABSTRACT

The present invention relates to a carrier for supporting a catalyst for a spacecraft thruster and to a method for preparing the same, and more particularly, to a catalyst carrier for a spacecraft thruster and method for preparing the same, in which the diameter and distribution of pores of the carrier are controlled using a pore inducing material to lengthen the life of the catalyst.

13 Claims, 1 Drawing Sheet

(51) Int. Cl.

| | | |
|---|---|---|
| *B01J 23/10* | (2006.01) | |
| *B01J 37/00* | (2006.01) | |
| *B01J 21/02* | (2006.01) | |
| *B01J 23/02* | (2006.01) | |
| *B01J 35/02* | (2006.01) | |
| *B01J 35/10* | (2006.01) | |
| *B01J 37/02* | (2006.01) | |
| *C06D 5/04* | (2006.01) | |

(56) References Cited

U.S. PATENT DOCUMENTS

| | | | |
|---|---|---|---|
| 5,897,971 A | * | 4/1999 | Araki et al. ............... 429/533 |
| 5,962,367 A | * | 10/1999 | Shen et al. ............... 502/439 |
| 6,080,379 A | * | 6/2000 | Nedez ............... B01D 53/8606 |
| | | | 423/511 |
| 6,211,103 B1 | * | 4/2001 | Tomaino et al. ............... 501/27 |
| 6,797,227 B2 | * | 9/2004 | Addiego ............... B01J 21/04 |
| | | | 264/630 |
| 2007/0112238 A1 | * | 5/2007 | Nicola ............... B01J 23/42 |
| | | | 585/601 |

FOREIGN PATENT DOCUMENTS

| | | |
|---|---|---|
| KR | 10-2003-0003632 | 1/2003 |
| KR | 10-2003-0095395 | 12/2003 |
| KR | 10-0661638 | 12/2006 |
| KR | 10-0712637 | 4/2007 |

OTHER PUBLICATIONS

Written Opinion dated Sep. 30, 2011, issued in Application PCT/KR2010/009130.

\* cited by examiner

CATALYST CARRIER FOR A SPACECRAFT THRUSTER AND METHOD FOR PREPARING SAME

CROSS-REFERENCE TO RELATED APPLICATIONS

The present application is a U.S. National Phase patent application under 35 U.S.C. §371 of International Application No. PCT/KR2010/009130, filed Dec. 21, 2010, which claims priority to Korean Patent Application No. 10-2009-0134608, filed Dec. 30, 2009, both of which are expressly incorporated herein by reference.

FIELD OF THE INVENTION

The present invention relates to a catalyst carrier for a spacecraft thruster and a method of manufacturing the same, and more particularly, to a catalyst carrier for a spacecraft thruster capable of improving a lifespan of the catalyst by controlling micropore size and distribution of the carrier using a porogen and a method of manufacturing the same.

BACKGROUND ART

In a spacecraft, a thruster is installed to control a posture. The thruster generally includes an iridium catalyst charged in an engine and hydrazine as a propellant. The thruster provides momentum by ejecting a gas generated by degradation of hydrazine through a nozzle. Here, the degradation of hydrazine is performed at a high temperature of 600 to 900° C., and generates rapid high-temperature thermal impact and high pressure when a high-pressure hydrazine liquid is sprayed on a surface of a catalyst and degraded. Due to the high temperature and pressure, the wearing out of the catalyst is stimulated, and the catalyst is lost, thereby continuously reducing an activity of the degradation of hydrazine.

The iridium catalyst for the degradation of hydrazine is charged in the thruster of the spacecraft, and should be used for 10 or more years when necessary. Accordingly, a crushing intensity characteristic of the catalyst is necessarily considered in manufacture of the catalyst. However, since the high temperature and pressure generated during the degradation of hydrazine cannot be tolerated only by a metal catalyst such as iridium, a catalyst for a spacecraft thruster is impregnated into a carrier. As such a carrier, generally, an alumina carrier is used.

A conventional alumina carrier is manufactured by calcining a raw material for alumina, aluminum hydroxide, through thermal treatment, molding the calcined product using an organic or inorganic binder, and crushing and wearing the molded product with a ball mill. An iridium metal salt is impregnated into the alumina carrier manufactured as described above to be used as a catalyst for a thruster. In a thruster using hydrazine as a propellant, the catalyst such as iridium is a main component, and an alumina carrier controlled in micropore characteristics is essential to the development and mass-production of such a catalyst.

However, the catalyst carrier for a thruster according to the prior art has the following problems:

The catalyst carrier for a thruster may have a continuous micropore size distribution of 1 to 10,000 nm. However, the conventional widely-used alumina carrier is composed of small micropores having a size of 1 to 10 nm even when the crushing and wearing processes are performed with a ball mill.

Accordingly, the catalyst carrier according to the prior art is decreased in a diffusion characteristic of a gas and a liquid and efficiency of the degradation of hydrazine, and thus it is difficult to control the pressure generated during the degradation of hydrazine. Particularly, due to failure at controlling the high pressure, the catalyst is crushed and worn out, and thus its lifespan is reduced. That is, a technical means for controlling the micropore size and distribution of the catalyst carrier for a thruster according to the prior art cannot be found, and thus the catalyst is crushed and worn out due to the high pressure generated during the degradation of hydrazine, thereby reducing the lifespan of the catalyst, that is, a lifespan of the thruster.

Technical Problem

The present invention is directed to providing a method of manufacturing a catalyst carrier for a spacecraft thruster which has an excellent reaction activity and improved lifespan of the catalyst by controlling micropore size and distribution of the catalyst carrier using a porogen.

The present invention is also directed to providing a catalyst carrier for a spacecraft thruster which has an excellent reaction activity and improved lifespan of the catalyst by controlling surface porosity and permeability using a porogen.

TECHNICAL SOLUTION

In one aspect, there is provided a method of manufacturing catalyst carrier for a spacecraft thruster including: a molding operation of obtaining a molded product using a paste including a raw material and a porogen; a first thermal treatment operation of performing thermal treatment by impregnating the molded product in an alkali solution; a second thermal treatment operation of performing thermal treatment by applying heat to the molded product treated with the first thermal treatment to remove the porogen; and a shape modulation operation of modulating a shape of the molded product treated with the second thermal treatment.

In another aspect, there is provided a catalyst carrier for a spacecraft thruster including macropores having a diameter of 1 to 100 μm formed on a surface thereof.

In still another aspect, there is provided a catalyst carrier for a spacecraft thruster having a permeability of 0.001 to 0.01 milidarcies, as measured by a liquid method.

Advantageous Effects

According to the present invention, micropore characteristics (i.e., micropore size and distribution) of a catalyst carrier may be controlled by a porogen. In addition, an activity of degradation of hydrazine is improved by controlling a diffusion characteristic of a gas and a liquid by the control of the micropore characteristics. Moreover, a pressure generated in the degradation of hydrazine may be controlled, thereby preventing crushing or wearing-out of the catalyst (and carrier). Accordingly, the present invention has an improved lifespan of the catalyst, that is, an improved lifespan of a thruster.

Best Mode

Figure 1:
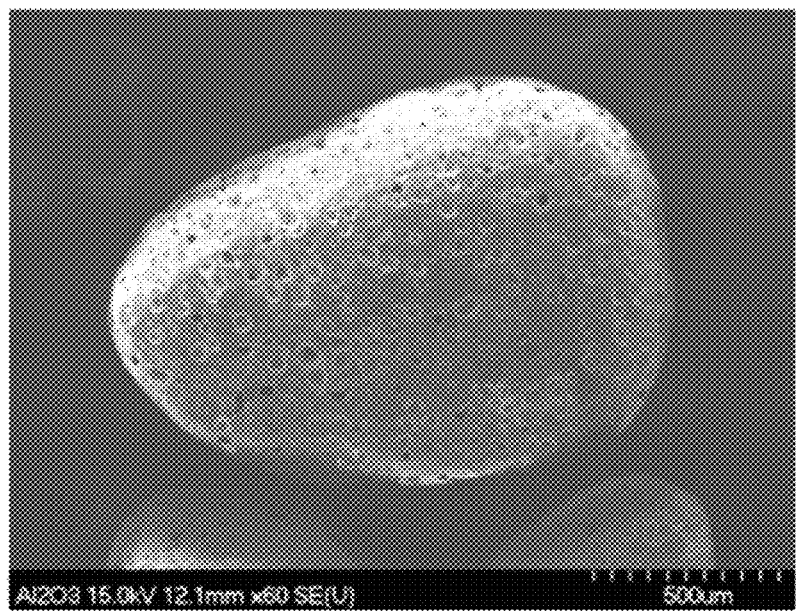
FIG. 1 is a 60× enlarged image of an alumina carrier manufactured by a method according to the present invention.

A method of manufacturing a catalyst carrier for a spacecraft thruster (hereinafter referred to as a "carrier") according to the present invention includes a molding operation of obtaining a molded product using a paste including a raw material and a porogen; a first thermal treatment operation of thermally treating the molded product while impregnating it in an alkali solution; a second thermal treatment operation of thermally treating the molded product treated with the first thermal treatment to remove the porogen; and a shape modulating operation of modulating a shape of the molded product treated with the second thermal treatment. According to the present invention, micropore characteristics, that is, micropore size and distribution, of the carrier are controlled by the porogen, and due to such control of the micropore characteristics, a diffusion characteristic of a gas and a liquid may be controlled. Hereinafter, the method will be described step by step.

Modes of the Invention

Molding

First, in the molding operation, a molded product having a certain shape is obtained using a paste including a raw material and a porogen. Here, the shape of the molded product may vary, and thus is not particularly limited. For example, the molded product may have a shape such as a cylinder (rod) or polyhedral (trigonal, tetragonal, etc.) shape.

The raw material is not particularly limited, and may be selected from conventional materials used as a raw material for a carrier. For example, in the case of manufacturing an alumina carrier, the raw material may include an aluminum (Al) precursor such as aluminum hydroxide. In another example, in the case of manufacturing a titania carrier, the raw material may include a titanium (Ti) precursor such as titanium hydroxide. Alternatively, the raw material may be selected from cerium (Ce) and silicon (Si) precursors. Moreover, the raw material may include a mixture of one or more materials selected from the above-mentioned precursors. Specifically, the raw material may include at least one (a mixture of one or more materials) selected from the group consisting of Al, Ti Ce and Si precursors.

In addition, the raw material may be in a powdery shape having various shapes and sizes, and preferably, having a size of 10 to 50 μm. More preferably, as the raw material, a product sold for industrial use is thermally treated at 500 to 700° C. for several seconds. Specifically, the raw material is thermally treated at 500 to 700° C. for 3 seconds to 2 hours in a nitrogen or air atmosphere.

The porogen is added to control the micropore characteristics of the carrier, that is, the micropore size and distribution of the carrier, and is removed in the second thermal treatment (calcining operation) to be described below. In other words, the micropore characteristics of the carrier are controlled by a size and content of the porogen. When the porogen has a large particle size and a high content in the paste, the micropore distribution may be increased along with macropores in the carrier.

In the present invention, the porogen may be any one having a particle phase, which may be removed (removed by carbonization) by heat generated in the second thermal treatment (the calcining operation). For example, the porogen may be one selected from the group consisting of a cellulose crystal, a wood chip and a synthetic resin chip. The size and content of the porogen are determined according to a desired micropore size and distribution. For example, the porogen may be wood chips having a size of 100 to 400 mesh, or finely ground using a ball mill to a size of 400 mesh or less, when necessary.

In addition, 0.2 to 30 parts by weight of the porogen may be used. That is, the molded product may include 0.2 to 30 parts by weight of the porogen with respect to 100 parts by weight of the raw material. The molded product preferably includes 1 to 10 parts by weight of the porogen with respect to 100 parts by weight of the raw material in consideration of the micropore distribution and intensity.

The paste includes at least the raw material and the porogen, but may also include water as a viscosity modulator for molding into a paste. Here, the paste may include 100 to 200 parts by weight of the viscosity modulator such as water with respect to 100 parts by weight of the raw material, but the present is not limited thereto. In addition, the paste may or may not include a conventionally used organic or inorganic binder.

Moreover, the paste may further include an additive conventionally used in the art. The kind and content of the additive are not particularly limited as long as they do not inhibit the characteristics of the carrier. The paste may be obtained by mixing 100 to 200 parts by weight of the viscosity modulator (e.g., water) and 1 to 10 parts by weight of the porogen (e.g., wood chips) with respect to 100 parts by weight of the raw material. In addition, the paste obtained as described above is molded into a molded product having a certain shape. Here, the shape of the molded product is not particularly limited as described above. For example, the molded product may be compression-molded in a cylinder (rod) shape having a diameter of 1.5 to 5 mm and a length of 2 to 30 mm by putting a paste in a mold and applying a pressure of 50 to 150 kgf/cm$^2$.

First Thermal Treatment

The first thermal treatment is performed by impregnating the molded product obtained as described above in an alkali solution. Here, the alkali solution may have a pH of 10 to 14. The alkali solution having a pH of 10 to 14 may be at least one selected from the group consisting of 0.5 to 10 wt % of sodium hydroxide, potassium hydroxide, calcium hydroxide and ammonia aqueous solutions. The molded product may be thermally treated at 100° C. or higher while being impregnated in the alkali solution. The molded product is preferably thermally treated at 100 to 200° C. for 24 to 96 hours while being impregnated in the alkali solution.

In the molded product obtained in the molding operation, the raw material and the porogen are distributed, and here, due to the first thermal treatment using the alkali solution, an adhesive characteristic is provided, thereby fixing the raw material and the porogen without mobility. The raw material and the porogen are fixed without mobility by the first thermal treatment, and then the porogen is removed in second thermal treatment (a calcining operation). Therefore, a uniform micropore distribution degree may be obtained.

Second Thermal Treatment

The molded product treated by the first thermal treatment undergoes the second thermal treatment at a high temperature. Here, the second thermal treatment is performed after the molded product treated by the first thermal treatment is filtered and separated from the alkali solution, and preferably after being filtered, separated and washed with distilled water. In the second thermal treatment, the raw material is calcined (sintered) by applying predetermined heat, thereby removing the porogen. The second thermal treatment may be performed at 300 to 500° C., which may vary according to the raw material and porogen used. In addition, the thermal treatment may be performed for 2 to 6 hours. Here, desired micropore characteristics (micropore size and distribution) of the carrier may be obtained by the removal (carbonization removal) of the porogen. That is, micropores are formed where the porogen is removed, and the micropore characteristics of the carrier are controlled by the size and content of the porogen, as described above.

Shape Modulation

A shape of the molded product treated by the second thermal treatment is modulated to facilitate packing in an engine of the thruster. That is, the shape of the molded product calcined by the second thermal treatment is modulated to facilitate the packing into a reactor in the thruster engine. In such a shape modulation operation, the shape and/or size of the molded product may be modulated by crushing or wearing the molded product. In the shape modulation operation, for example, the shape may be modulated by crushing or wearing the molded product using a ball mill, or self-wearing the molded product in a liquid. For example, when the ball mill is used and 50 g of the molded product is worn out, the modulation operation may be performed for 6 to 24 hours, but the time may be changed according to the size and amount of the molded product. The molded product may have a spherical or oval shape according to the shape modulation operation. In addition, the molded product may have a size of 10 to 50 mesh, and preferably 14 to 30 mesh.

According to the method of the present invention described above, the micropore characteristics (micropore size and distribution) of the carrier may be controlled by the porogen. That is, as described above, through the modulation of the particle size and content of the porogen, the micropore characteristics of the carrier may be controlled. In addition, the diffusion characteristic of the gas and liquid may be controlled by the control of the micropore characteristics. Accordingly, according to the present invention, optimum micropore characteristics capable of increasing an activity of the hydrazine degradation may be obtained. In addition, a pressure generated in the degradation of hydrazine may be controlled by the control of the micropore characteristics, thereby preventing the crushing or wearing-out of the catalyst (and carrier), resulting in improving a lifespan of the catalyst, that is, a lifespan of the thruster.

Meanwhile, the carrier according to the present invention is manufactured by the method of the present invention, and thus has the controlled micropore characteristics and excellent physical properties (permeability, etc.).

Specifically, the carrier according to the present invention includes micropores having a nanometer size as in the prior art, but at least includes macropores having a size of 1 to 100 μm formed on a surface thereof by the control of the micropore characteristics. That is, the carrier has a micropore characteristic by formation of the micropores having 1 to 100 μm. Also, the macropores are preferably formed on 5 to 10% of the surface area. That is, the macropores having a size of 1 to 100 μm present on the surface are preferably formed 5 to 10% of the total surface area. Here, the macropores may be continuously and evenly distributed in the range of 1 to 100 μm. That is, the macropores may be distributed in various sizes, rather than formed in a specific size, within the range of 1 to 100 μm. Moreover, the macropores may be connected with adjacent macropores.

In addition, the carrier according to the present invention may have a permeability measured by a liquid method of 0.001 to 0.01 milidarcies by the control of the micropore characteristics in the method of manufacturing a carrier of the present invention. Here, in the present invention, the permeability is a value measured by the liquid method using Poiseuille's law. The carrier according to the present invention may have the permeability in the above range, thereby improving a diffusion rate of the degradation of hydrazine, and may have a low pressure load during the reaction, thereby preventing the crushing and wearing-out of the catalyst, and having high effective momentum.

The carrier according to the present invention described above may be a carrier for a thruster of a spacecraft, that is, a carrier useful for carrying a catalyst stimulating the degradation of hydrazine of the thruster. The carrier according to the present invention may be, but is not limited to, an alumina carrier, a titania carrier, a silica carrier or a bauxite carrier depending on the raw material to be used. In addition, the carrier according to the present invention may carry a metal catalyst selected from, but not particularly limited to, iridium, rhenium, platinum, palladium or a mixture thereof.

Meanwhile, the accompanying FIG. 1 shows a 60× enlarged image of an alumina carrier manufactured by the method according to the present invention. As shown in FIG. 1, it is seen that macropores are distributed on a surface of the alumina carrier.

Figure 2:
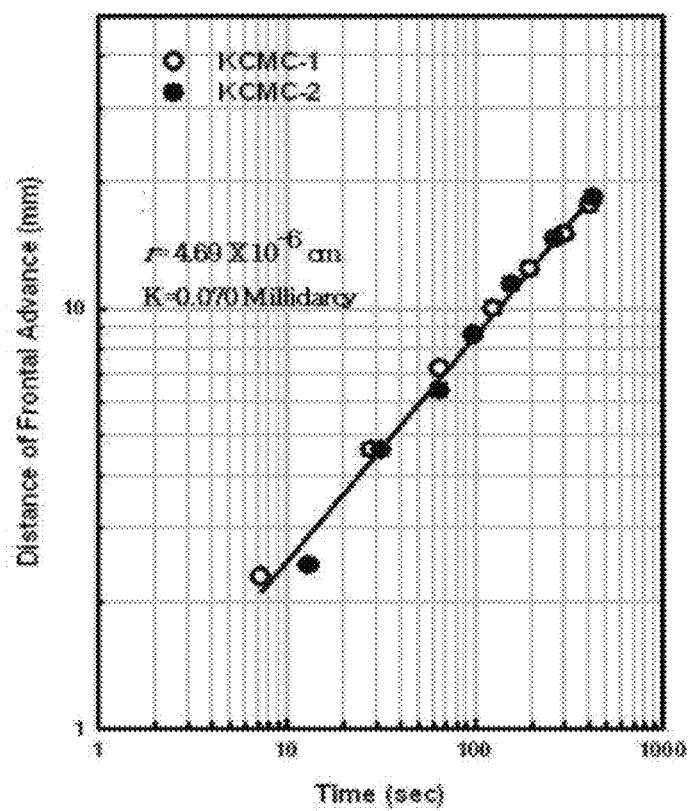
FIG. 2 is a graph showing a liquid diffusion rate (permeability) according to time for an alumina carrier manufactured by a method according to the present invention.

In addition, FIG. 2 is a graph showing a liquid diffusion rate (permeability) according to time for the alumina carrier manufactured by the method according to the present invention. Here, the result shown from FIG. 2 is obtained by measuring a cylinder (rod)-shaped alumina carrier having a diameter of 2.5 mm and a length of 15.0 mm as test samples by the liquid method using Poiseuille's law. Specifically, FIG. 2 shows a graph plotted using values calculated by the following Equation by diffusing ink-diluted water from an end of the alumina carrier.

$$K = \frac{r^2 \Phi}{8} \quad \text{Equation}$$

In the above Formula, K is permeability (unit: milidarcy), $\gamma$ is a size of micropores distributed in the alumina carrier, and $\Phi$ is porosity of the alumina carrier.

Moreover, FIG. 2 shows repeatability detected using two alumina carriers manufactured by the same process. That is, in the graph of FIG. 2, the samples KCMC-1 and KCMC-2 are manufactured by the same process. As shown in FIG. 2, it is seen that the alumina carrier has excellent micropore characteristics and a fast liquid diffusion rate (permeability).

While the invention has been shown and described with reference to certain exemplary embodiments thereof, it will be understood by those skilled in the art that various changes in form and details may be made therein without departing from the scope of the invention as defined by the appended claims.

What is claimed is:

1. A method of manufacturing a catalyst carrier for a spacecraft thruster, comprising:
   molding a paste including a raw material and a porogen to obtain a molded product;
   performing a first thermal treatment operation while impregnating the molded product in an alkali solution;
   separating the molded product from the alkali solution;

performing a second thermal treatment operation by applying heat to the molded product treated with the first thermal treatment operation and separated from the alkali solution to remove the porogen; and modulating a shape of the molded product treated with the second thermal treatment operation, wherein the first thermal treatment operation is performed at a temperature of 100 to 200° C. and the second thermal treatment operation is performed at a temperature of 300 to 500° C.

2. The method according to claim 1, wherein the raw material includes at least one selected from the group consisting of aluminum (Al), titanium (Ti), cerium (Ce) and silicon (Si) precursors.

3. The method according to claim 1, wherein the raw material has a size of 10 to 50 µm.

4. The method according to claim 1, wherein the raw material is thermally treated at a temperature of 500 to 700° C.

5. The method according to claim 1, wherein the porogen is at least one selected from the group consisting of cellulose crystals, wood chips and synthetic resin chips.

6. The method according to claim 1, wherein the molded product includes 0.2 to 30 parts by weight of the porogen with respect to 100 parts by weight of the raw material.

7. The method according to claim 1, wherein the molded product is formed in a rod shape having a diameter of 1.5 to 5 mm and a length of 2 to 30 mm.

8. The method according to claim 1, wherein the paste includes 100 to 200 parts by weight a viscosity modulator and 1 to 10 parts by weight of the porogen with respect to 100 parts by weight of the raw material.

9. The method according to claim 1, wherein the alkali solution in the first thermal treatment operation has a pH of 10 to 14.

10. The method according to claim 1, wherein the alkali solution in the first thermal treatment operation is at least one selected from the group consisting of sodium hydroxide, potassium hydroxide, calcium hydroxide and ammonia aqueous solutions.

11. The method according to claim 1, wherein shape modulation is performed to modulate the shape of the molded product by crushing or wearing the molded product treated with the second thermal treatment operation.

12. The method according to claim 11, wherein shape modulation results in the molded product treated with the second thermal treatment operation having a spherical or oval shape.

13. The method according to claim 11, wherein shape modulation results in the molded product treated with the second thermal treatment operation having a size of 10 to 50 mesh.

* * * * *